United States Patent [19]
Ichikawa et al.

[11] Patent Number: 4,859,734
[45] Date of Patent: Aug. 22, 1989

[54] COMPOSITION OF POLYARYLENE THIOETHER

[75] Inventors: Yukio Ichikawa; Takayuki Katto, both of Iwaki, Japan

[73] Assignee: Kureha Kagaku Kogyo Kabushiki Kaisha, Tokyo, Japan

[21] Appl. No.: 176,155

[22] Filed: Mar. 31, 1988

[30] Foreign Application Priority Data

Mar. 31, 1987 [JP] Japan .................................. 62-79187

[51] Int. Cl.$^4$ ................................................ C08K 3/34
[52] U.S. Cl. ...................................... 524/447; 524/609
[58] Field of Search ............................................ 524/447

[56] References Cited

U.S. PATENT DOCUMENTS

| 3,894,983 | 7/1975 | Higbee | 524/447 |
| 4,134,874 | 1/1979 | Needham | 524/431 |
| 4,365,037 | 12/1982 | Adachi et al. | 524/609 |
| 4,575,429 | 3/1988 | Jacobson | 252/12 |
| 4,609,699 | 9/1986 | Meyer et al. | 524/609 |
| 4,657,945 | 4/1987 | Reichert et al. | 523/200 |
| 4,699,975 | 10/1987 | Katto et al. | |

FOREIGN PATENT DOCUMENTS 57-063355 4/1982 Japan .
59-131653 7/1984 Japan .
62-035825 2/1987 Japan .

Primary Examiner—John C. Bleutge
Assistant Examiner—David W. Woodward
Attorney, Agent, or Firm—Oblon, Spivak, McClelland, Maier & Neustadt

[57] ABSTRACT

Disclosed herein is a composition of polyarylene thioether prepared by combining 0.001 to 10 parts by weight of kaoline of the mean particle diameter of 0.03 to 2 μm with 100 parts by weight of polyarylene thioether having the repeating unit of

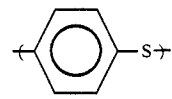

as the main constituent. The composition of polyarylene thioether has a high crystallization rate and forms a minute spherulite structure. Moreover, the composition having a short molding cycle at the time of melt molding, generates a small amount of the flash and gives the molded products excellent in mechanical properties.

Disclosed herein also is a composition prepared by further combining an inorganic filler and/or a fibrous filler with the above-mentioned composition of polyarylene thioether.

3 Claims, No Drawings

COMPOSITION OF POLYARYLENE THIOETHER

BACKGROUND OF THE INVENTION

The present invention relates to a composition of polyarylene thioether (hereinafter referred to as PATE) having a high crystallization rate and forming a minute spherulite structure.

More in detail, the present invention relates to (1) a composition of PATE having a high crystallization rate and being prepared by combining 0.001 to 10 parts by weight of kaoline of a mean particle diameter of 0.03 to 2 μm with 100 parts by weight of PATE having the repeating unit of

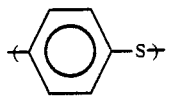

as the main constituent and (2) a composition of PATE prepared by further combining an inorganic filler and-/or a fibrous filler with the composition of PATE of (1).

PATE is a resin developed as a heat-resistant, chemical-resistant and flame-resistant thermoplastic resin. Particularly, since PATE is crystalline, PATE can be melt processed such as injection molding, extrusion molding and has a characteristic points that molded products obtained from PATE are excellent in physical properties such as dimensional stability, strength, hardness, insulating property.

Taking advantage of these characteristic points, PATE is used in the fields of electricity, electronics, cars, aeroplanes, precision machinery and chemical engineering, etc.

However, the conventional PATE has a defect that its crystallization rate is low and accordingly often results to have coarse spherulites.

Because of the above defect, when PATE is fabricated, for example, with injection molding, there has been a problem which lead to practical physical defects such as long molding cycle, many occurrence of flashes and low mechanical properties of molded products.

To improve the defect, use of a nucleating agent can be considered, however, there is not such agent, according to our knowledge, that is effective to all crystalline polymers and there has certainly been no such agent effective for PATE.

As a result of the present inventors' extensive studies for a nucleating agent effective to PATE, it has been found out that kaoline gives an excellent effect to PATE as the agent, namely, has the effect of improving the crystallization rate and of micronizing the spherulites.

The present invention has been completed based on the finding.

SUMMARY OF THE INVENTION

The object of the present invention is to provide a composition of PATE which has a large crystallization rate and forms a minute spherulite structure.

Further, the object of the present invention is to provide a composition of PATE which has a short cycle of melt-molding, has flashes in only a small amount and gives molded products excellent in mechanical properties.

Still, the object of the present invention is to provide a composition of PATE prepared by combining 0.001 to 10 parts by weight of kaoline of the mean particle diameter of 0.03 to 2 μm with 100 parts by weight of PATE having the repeating unit of

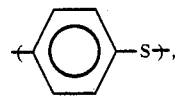

as the main constituent.

Still more, the object of the present invention is to provide a composition of PATE prepared by further combining an inorganic filler and/or a fibrous filler with the composition of PATE with which kaoline has been combined.

DETAILED DESCRIPTION OF THE INVENTION

The composition of PATE according to the present invention contains 0.001 to 10 parts by weight of kaoline having a mean particle diameter of 0.03 to 2 μm to 100 parts by weight of PATE having a repeating unit of

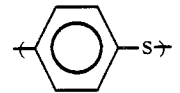

and is characterized in that the 50% crystallization time, $\tau_{\frac{1}{2}}$, at 250° C. is not more than $\frac{1}{3}$, namely, has higher crystallization rate, as compared to that of PATE not containing kaoline.

Another composition of PATE according to the present invention contains 0.001 to 10 parts by weight of kaoline having a mean particle diameter of 0.03 to 2 μm and 0.1 to 300 parts by weight of an inorganic filler and/or a fibrous filler in 100 parts by weight of PATE having a repeating unit of

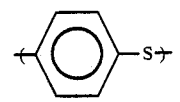

and is characterized in that the 50% crystallization time, $\tau_{\frac{1}{2}}$, at 250° is not more than $\frac{1}{3}$, namely, has higher crystallization rate, as compared to that of PATE not containing kaoline.

The composition according to the present invention has characteristic points that the composition has a high crystallization rate and forms a minute spherulite structure, and accordingly it can preferably be used for various fabrications, such as extrusion molding, inflation molding, injection molding, compression molding and blow molding. Of these fabrications, it can preferably be used particularly in injection molding.

Composition of PATE

PATE

Although PATE generally means a polymer having a repeating unit of

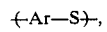

(wherein Ar is an arylene group) as constituent, PATE according to the present invention has paraphenylene group among the arylene groups as the main constituent.

The words "has the paraphenylene group as the main constituent" means that the PATE contains paraphenylene group of not less than 60 mol%, preferably not less than 75 mol% in all arylene groups in it.

PATE having the paraphenylene group as the main constituent is preferable from the viewpoint of physical properties of the composition such as heat-resistance, moldability and mechanical properties.

As an arylene group other than paraphenylene group as the main constituent, m-phenylene group,

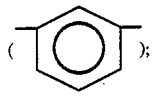

o-phenylene group,

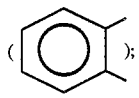

alkyl-substituted phenylene group,

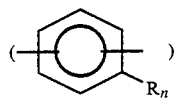

(R is an alkyl group, preferably a lower alkyl group and n is an integer of 1 to 4); p,p'-diphenylene sulfone group,

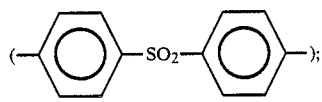

p,p'-biphenylene group,

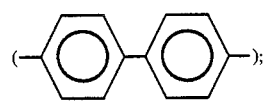

p,p'-diphenylene ether group,

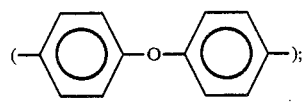

p,p'-diphenylene carbonyl group,

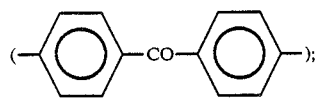

naphthalene group,

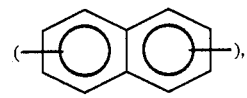

can be used.

From the viewpoint of the processability, copolymer containing different kind of repeating unit is preferable to a homopolymer consisting only of the repeating unit of

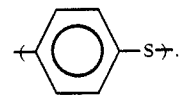

As the copolymer, a copolymer of

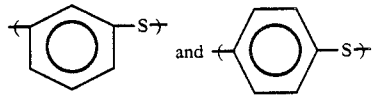

is preferred. Particularly, those containing the respective repeating units in a block form is preferred to those containing them in a random form(for instance, as described in EPC No. 166,451-A), because the block-copolymer is remarkably excellent in physical properties (heat resistance, mechanical property, etc.) although the block- and random-copolymers are substantially equal in their processabilities. 5 to 50 mol% of repeating unit of

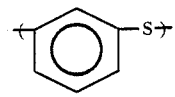

in the block copolymer is preferable and 10 to 25 mol% is particularly preferable.

As the PATE according to the present invention, those having substantially linear structure are preferred from the viewpoint of the processability and the physical property. The words "those having substantially linear structure" do not mean the polymer obtained by curing such as oxidation or thermal cross-linking but means the polymer obtained by condensation polymerization of a monomer substantially having a bifunctional monomers as the main body.

However, within a range of not spoiling the physical properties of molded products, a cross-linked PATE obtained by using a minute amount of a crosslinking agent (for instance, 1,2,4-trihalobenzene) during polymerization is allowable. As the PATE according to the present invention, the PATE which is not thermally cross-linked is preferable, because The PATE which is thermally cross-linked has many branched and cross-linked structures, its molded product is poor in mechanical properties and is severely colored and thermal stability of the composition during melt processing is low. Accordingly, such a PATE is not preferable from the viewpoint of physical properties and processability of the composition and physical properties of the molded product.

As the PATE according to the present invention, those having a melting point of over 250° C. are preferable. Because, when the melting point is below 250° C., the largest characteristic point as a heat-resistant polymer is spoiled.

The PATE which is favorable for the present invention can generally be manufactured by bringing an alkali metal sulfide (for instance, sodium sulfide) and a halo-aromatic compound consisting mainly of paradihalobenzene into dehalogenation- and sulfidation-reaction in an aprotic, organic polar solvent (for instance, N-methylphyrrolidone). Such a PATE can be economically manufactured by the method described in U.S. Pat. No. 4,645,826 applied by the present inventors. As an another method, the method of obtaining a PATE of a high molecular weight by adding a large amount of a polymerization aid such as salts of carboxylic acid, etc. can be used (refer to U.S. Pat. No. 3,919,177). However, the latter method is disadvantageous from an economical standpoint.

Kaoline

Kaoline is a hydrated aluminum silicate represented by the basic chemical formula, $Al_2Si_2O_5(OH)_4 \cdot nH_2O$ and its representative chemical composition is as follows:

| | | | |
|---|---|---|---|
| $SiO_2$ | 42 to 55%, | CaO | 0 to 1% |
| $Al_2O_3$ | 37 to 45%, | MgO | 0 to 0.3% |
| $TiO_2$ | 0 to 3% | $K_2O$ | 0 to 0.5% and |
| $Fe_2O_3$ | 0 to 1% | $Na_2O$ | 0 to 0.6%. |

As kaoline of the present invention, a commercialized product of kaoline or its pulverized product can be used, and the amount of kaoline to be added is favorably 0.001 to 10 parts, preferably 0.01 to 8 parts and more preferably, 0.01 to 5 parts by weight to 100 parts by weight of PATE. When kaoline is below 0.001 part by weight, effect of the nucleating agent is poor, and when kaoline is more than 10 parts by weight, the effect is not improved in proportion to the amount of kaoline. Namely, the addition of kaoline more than 10 parts by weight is meaningless.

The addition of kaoline can be done by any optional method. For instance, there are a method of adding kaoline powder to a powdery PATE, a method of adding kaoline at the time of molding PATE and a method in which kaoline is added to the slurry of the PATE polymer afer the step of polymerization and the mixture is dehydrated and dried. Further, there is a method in which kaoline is combined in an mount more than the predetermined amount with PATE to form a so-called master batch and by kneading this master batch with PATE, the composition uniformly containing predetermined concentration of kaoline can easily be obtained.

Because the finer the kaoline powder is, the higher its dispersibility in PATE and accordingly its nucleating effect is, it is desirable to use kaoline having average diameter of not larger than 2 .µm, preferably of not larger than 1.5 µm, more preferably of around 1 µm. When a mean particle diameter of kaoline is larger than 2 µm, the effect as the nucleating agent is poor, and on the other hand, kaoline having a mean particle diameter of not larger than 0.03 µm is difficult in handling and it takes time to mix with PATE and these two cases are not preferable. The mean particle diameter, is measured by a particle size distribution tester of centrifugal sedimentation type (made by Shimazu Seisakusho, Ltd., Model: SA-CP-20).

Composition

The composition according to the present invention comprises PATE, kaolin as a nucleating agent and, when necessary, a filler.

The words "comprises" means that the composition may contain supplementary component(s) unless the addition of the component is not contrary to the purpose of the present invention (details will be described later).

Further, the composition according to the present invention includes not only the material formed by mixing each component as powder but also the material of which resin component is in a coherent state formed through its molten state. The coherent state is the representative one and is generally produced as pellets, etc. The powdery state of the composition can be produced by uniformly mixing each component with a blender, a mixer or a mill.

Kaoline in the present invention is used as the nucleating agent. Accordingly, the composition according to the present invention is characterized in that the 50% crystallization time, $\tau\frac{1}{2}$, (at 250° C.) is not longer than 1/3, usually not longer than 1/5 as compared to the composition without kaoline. The method for determining the 50% crystallization time, $\tau\frac{1}{2}$, will be shown later in Examples.

The supplementary components will be further described in detail as follows:

Although the composition of PATE of the present invention can be singly applied to various melt-processing processes, it can also be used as the composition prepared by further combining (i) fibrous fillers such as glass fibers, carbonaceous fibers, silica fibers, alumina fibers, silicon carbide fibers, zirconia fibers, calcium titanate fibers, wollastonite, calcium sulfate fibers, aramide fibers, etc. and/or (ii) inorganic powdery fillers such as talc, mica, clay, calcium carbonate, magnesium carbonate, calcium silicate, magnesium silicate, silica, alumina, titanium white, carbon black, calcium sulfate, iron oxide, zinc oxide, copper oxide, etc.

Further, the composition of PATE according to the present invention can use as the composition component one or more than one kind of the materials selected from the group consisting of (iii) synthetic resins other than PATE, such as, polyolefin, polyester, polyamide, polyimide, polyether imide, polycarbonate, polyether sulfone, polyether ketone, polyether ether ketone, polyarylene, polyacetal, polyvinylidene fluoride, polytetrafluoroethylene, polystyrene, ABS resin, epoxy resin, urethane resin, silicone resin and phenol resin, or (iv) elastomers, such as, polyolefin rubber, fluorine rubber, silicone rubber, hydrogenated SBR, butyl rubber, polyester rubbers, polyamide rubbers.

Still more, if necessary, additive(s) such as coupling agent, antioxidant, coloring matter, ultraviolet ray-absorbing agent and wax can be added to the composition.

Further, in order to maintain the characteristic points of the composition of the present invention, it is preferable that PATE is contained at least not less than 25 wt%, more preferable not less than 30 wt% and particularly preferable not less than 50 wt% in the composition.

One concrete example of the compositions is the one prepared by combining 0.001 to 10 parts by weight of kaoline, 0.1 to 300 parts by weight of an inorganic filler [above (i)] and/or a fibrous filler [above (ii)] with 100 parts by weight of PATE having a repeating unit of

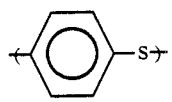

as the main constituent. Further, it goes without saying that the composition can further contain a synthetic resin [above (iii)] and/or an elastomers [above (iv)].

Uses of the Composition

The composition of PATE according to the present invention (including the complex compounds) can be utilized in various fields taking advantage of its characteristic points, such as, high crystallization rate and minute spherulite structures. For instance, the composition is favorably used in producing various molded products by injection molding and sheets, films, pipes, fibers, etc. by extrusion molding. Particularly, injection molding is favorably used because of its characteristic point, i.e., short molding cycle.

EXPERIMENTAL EXAMPLES

Methods for Evaluating the Specific Characters of the Composition (1) Measurement of the crystallization rate With a measuring apparatus DSC 7 (manufactured by Perkin-Elmer Co.), the 50% crystallization time, $\tau\frac{1}{2}$, of a composition was measured by a conventional method [for instance, refer to "Kobunshi Kagaku", 25 155(1968)], the measuring conditions are as follows:

After heating each of the sample sheets for 20 seconds at 320° C., the heated sample sheet was maintained for 10 seconds under a pressure of 50 kg/cm$^2$ G and then put into iced water to obtain a rapidly cooled press sheet (hereinafter referred to as "rapidly cooled press sheet").

After melting about 5 mg of a rapidly cooled press sheet sample for 1 minute at 340° C. in a flow of nitrogen gas, the molten sample was rapidly cooled to its crystallization temperature to obtain an isothermal crystallization curve of the sample at the temperature.

From the isothermal crystallization curve, $\tau\frac{1}{2}$, which is the time that is necessary to crystallize half ($\frac{1}{2}$) of the component which is crystallizable at 250° C., is obtained. The shorter 50% crystallization time means the higher crystallization rate.

(2) Measurement of the size of spherulite

After maintaining a rapidly cooled press sheet sample in a molten state for 1 minute at 340° C. under nitrogen gas, the sample was rapidly cooled to 250° C. to isothermally crystallize. The size of spherulites when they collided each other at 250° C. was measured with a polarizing microscope having a heating stage (a cooling and heating apparatus for microscope, manufactured by Lincom Co., Model: TH-600).

EXAMPLE 1

Into an autoclave, 37.3 kg of hydrated sodium sulfide (purity: 46.1 %) and 100 kg of N-methylpyrrolidone (NMP) were introduced, and the content of the autoclave was heated to 190° C. to distill 14.3 kg of water and 4.06 kg of NMP out. Then, 35.7 kg of p-dichlorobenzene were charged and polymerization was carried out for 3 hours at 220° C.

Then, 7.7 kg of water were charged, and the temperature was raised to 260° C. to carry out polymerization for 1 hour.

After collecting the formed polymer from the reaction mixture by sieving and washing the collected polymer with methanol, water, an aqueous 2 % solution of NH$_4$Cl and water, the washed polymer was dried to obtain a PATE polymer.

The apparent melt viscosity of the obtained PATE polymer at 310° C. and a shear rate of 10,000 second$^{-1}$ was 30 poise.

To 100 parts by weight of a powder of the polymer, 1.0 part by weight of each of the additives shown in Table 1 was added, the mixture was blended with a Henschel mixer and was extruded into pellets with an extruder (made by Plabor Co., Model: BT-30).

The results of examination of the characteristic properties of the obtained composition are shown in Table 1.

As are sen in Table 1, the composition according to the present invention has the high crystallization rate and small and uniform spherulites in size.

EXAMPLE 2

Into an autoclave, 42.4 kg of hydrated sodium sulfide (purity: 46.07 %) and 93 kg of NMP were introduced, and the content of the autoclave was heated to 190° to distill water out. Then, 36.6 kg of p-dichlorobenzene were charged into the autoclave and polymerization was carried out for 5 hours at 220° C.

Then, 7 kg of water were charged into the autoclave, the temperature was raised to 255° C. and the polymerization was performed for another 5 hours.

After collecting the polymer from the reaction mixture by sieving, the collected polymer was washed with methanol, water, an aqueous 2 % solution of NH$_4$Cl and water and dried to obtain a PATE polymer.

The apparent melt viscosity of the PATE polymer obtained at 310° C. and the shear rate of 200 second$^{-1}$ was 2,000 poise.

To 100 parts by weight of a powder of the PATE polymer, 40 parts by weight of glass fiber of 13 μm in diameter (manufactured by Nihon Denki Glass Co., Ltd.) and 1.0 part by weight of an additive shown in Table 2 were added, and the mixture was extruded into pellets with an extruder (made by Plabor Co., Model: BT-30).

The results of examination of the characteristic properties of the compositions are shown in Table 2, and further, the size of spherulite of the composition obtained in Example 2 was not measured, because the composition contained additives (glass fibers, etc.).

As can be seen in Table 2, kaoline of mean particle diameter of not larger than 2 μm in the present invention is also effective in the complex composition with glass fiber.

TABLE 1

| | Additive | $\tau_{\frac{1}{2}}$ 250° C. (second) | Size of spherulite (μm) |
|---|---|---|---|
| Comparative Example | Without any additive | 100 | 35 |
| Present invention | Kaoline: made by SHIRAISHI CALCIUM Co., Ltd. under the registered name of BURGUS 5178 (mean particle diameter: 1.0 μm) | 11 | 4 |
| Comparative Example | "AEROSIL" *1: Made by NIHON AEROSIL Co., Ltd. (mean particle diameter: 0.04 μm) | 140 | 40 |
| Comparative Example | Alumina: NIHON KEISINZOKU CO., LTD. under the mark of AE S-21 (mean particle diameter: 0.6 μm) | 160 | 40 |

Note:
*1 AEROSIL is a minute powder of anhydrous silicic acid, which has been surface-treated to prevent coagulation

TABLE 2

| | Additive | $\tau_{\frac{1}{2}}$ at 250° C. (second) |
|---|---|---|
| Comparative Example | Without any additive | 700 |
| Present Invention | Kaoline: made by SHIRAISHI CALCIUM Co., Ltd. [CB] (mean particle diameter: 1.0 μm) | 111 |
| Present Invention | Kaoline: made by SHIRAISHI CALCIUM Co., Ltd. [TAISHIN] (mean particle diameter: 0.8 μm) | 67 |
| Comparative Example | Alumina: made by SHOWA KEIKINZOKU Co., Ltd. [AES-11] (mean particle diameter: 0.4 μm) | 900 |
| Comparative Example | Alumina: made by SHOWA KEIKINZOKU Co., Ltd. [AES-23] (mean particle diameter: 1.8 μm) | 930 |
| Comparative Example | Kaoline: made by SHIRAISHI CALCIUM Co., Ltd. [BURGES No.40] (mean particle diameter: 4.5 μm) | 500 |

What is claimed is:

1. A composition of polyarylene thioether having a high crystallization rate, which comprises 100 parts by weight of polyarylene thioether having a repeating unit of

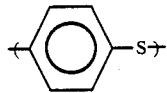

as the main constituent and 0.001 to 10 parts by weight of kaoline having a mean particle diameter of 0.03 to 2 μm.

2. The composition of polyarylene thioether according to claim 1, wherein said crystallization rate is, when the crystallization rate is measured as the 50% crystallization time, $\tau_{\frac{1}{2}}$, at a temperature of 250° C., not more than 1/3 as compared to the rate of the composition without kaoline.

3. A composition of polyarylene thioether, having a high crystallization rate, which comprises 100 parts by weight of polyarylene thioether having a repeating unit of

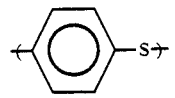

as the main constituent; 0.001 to 10 parts by weight of kaolin having a mean particle diameter of 0.03 to 2 μm; and 0.1 to 300 parts by weight of an inorganic powdery filler other than kaolin, a fibrous filler or a mixture of the two fillers.

* * * * *